Figure 1:
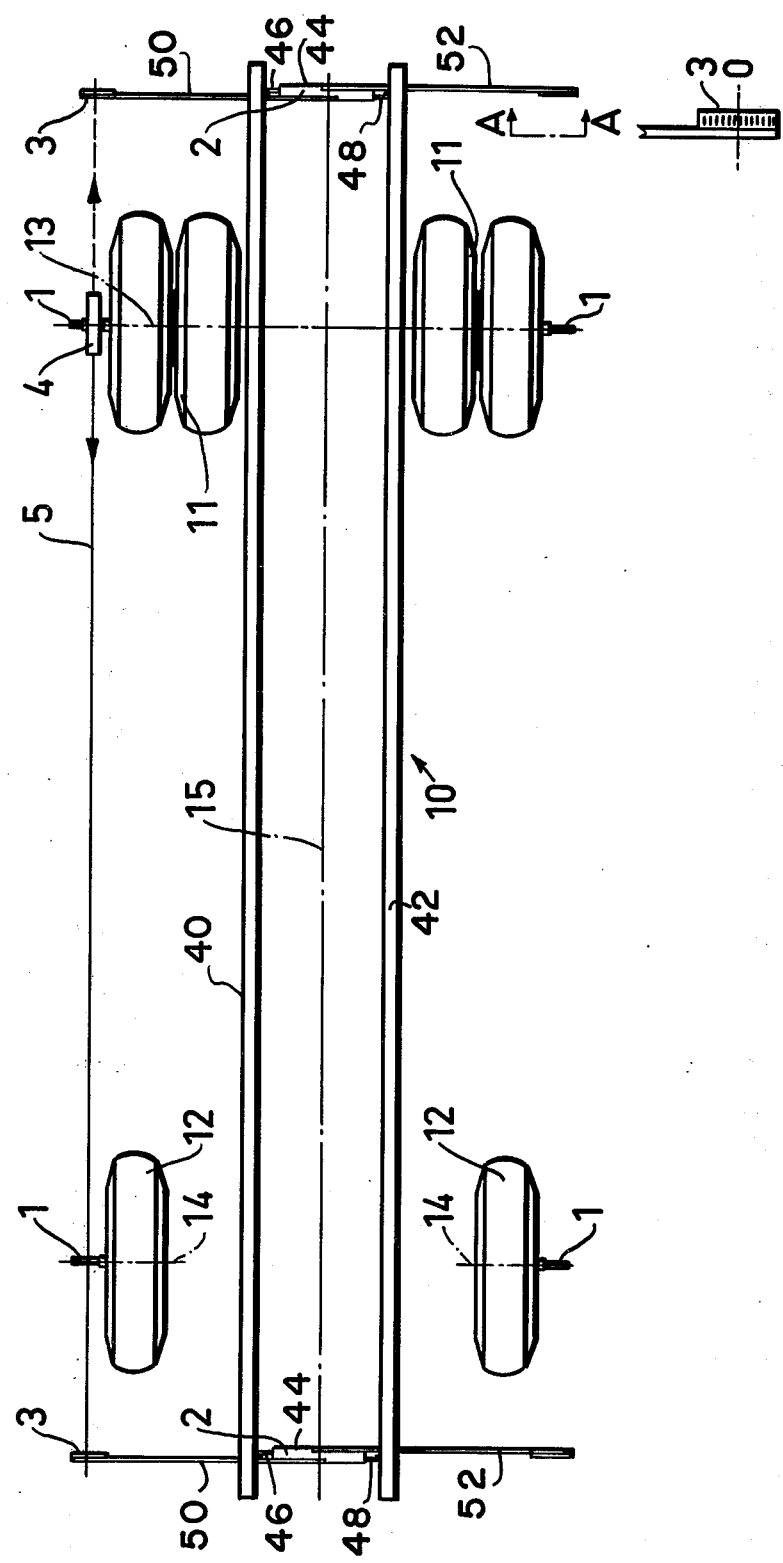

United States Patent [19]

Samuelsson et al.

[11] 4,159,574
[45] Jul. 3, 1979

[54] METHOD OF MEASURING THE ANGULAR POSITION OF THE AXIS OF ROTATION OF A WHEEL

[76] Inventors: Erik Samuelsson, 6 Nygatan, Rättvik, Sweden, 79500; Jonas Samuelsson, 15 Syrénvägen, Örebro, Sweden, 70220

[21] Appl. No.: 888,616

[22] Filed: Mar. 21, 1978

Related U.S. Application Data

[63] Continuation of Ser. No. 691,440, Jun. 1, 1976, abandoned, which is a continuation of Ser. No. 530,426, Dec. 6, 1974, abandoned.

[30] Foreign Application Priority Data

Dec. 7, 1973 [SE] Sweden .............................. 7316572

[51] Int. Cl.² .......................................... G01B 11/275
[52] U.S. Cl. ........................................ 33/228; 33/193; 33/203.18; 33/288
[58] Field of Search ................. 33/193, 203.18, 203.19, 33/288, 228

[56] References Cited

U.S. PATENT DOCUMENTS

| 2,249,226 | 7/1941 | Peters | 33/288 |
| 2,292,969 | 8/1942 | Peters | 33/288 |
| 2,755,554 | 7/1956 | MacMillan | 33/288 |
| 3,029,515 | 4/1962 | Marteil | 33/288 |
| 3,409,990 | 11/1968 | Vorpahl | 33/288 |
| 4,015,339 | 4/1977 | Hörvallius | 33/288 |

FOREIGN PATENT DOCUMENTS

1295201 4/1962 France ........................... 33/288

Primary Examiner—Richard R. Stearns
Attorney, Agent, or Firm—Donal B. Tobin

[57] ABSTRACT

For measuring the angular position of the rotational axis of a wheel, in relation to the longitudinal axis of the associated vehicle, a sight line is provided across an extension of the rotary axle of the wheel and substantially in a plane in common with the longitudinal axis, and that optical extensions of the sight line in both directions are compared with each other each in one point with respect to the positions of the points relative to the longitudinal axis.

6 Claims, 5 Drawing Figures

4,159,574

METHOD OF MEASURING THE ANGULAR POSITION OF THE AXIS OF ROTATION OF A WHEEL

This is a continuation, of application Ser. No. 691,440, filed June 1, 1976 now abandoned, which is a continuation of application Ser. No. 530,426 now abandoned filed Dec. 6, 1974.

This invention relates to a method for measuring the angular position of the axis of rotation of a wheel in relation to the longitudinal axis of the associated vehicle. The measuring of said angular position is of interest when vehicles after a repair or damage are to be controlled to determine the extent of the damage. It is for a correct road performance of the vehicle essential that the angular position of the wheel axles in relation to the longitudinal axis of the vehicle be 90°.

Heretofore, the angular position had to be measured by means of measuring rods and tape-measures, in such a manner, that certain fixed points were positioned on the longitudinal axis of the vehicle or a corresponding axis and utilized as reference points. This method, however, is troublesome and not in all cases reliable, as the reference points must be positioned on the vehicle frame where they often will lie in positions difficult to access.

The present invention has as its object to overcome the said difficulties and to provide a method rendering it possible to accurately determine the position of the axis of rotation of a wheel in relation to the longitudinal axis of the vehicle. By said method it is possible either to determine the deviation and/or to make with the wheel axle adjustments whilst reading until the axis of rotation is in a position accurately perpendicular in relation to the longitudinal axis of the vehicle.

The new method, which eliminates the disadvantages of previous methods, is characterized in that a sight line is provided across an extension of the rotary axle of the wheel and substantially in a plane in common with the longitudinal axis, and that optical extensions of the sight line in both directions are compared with each other each in one point with respect to the positions of the points relative to the longitudinal axis.

Figure 2:
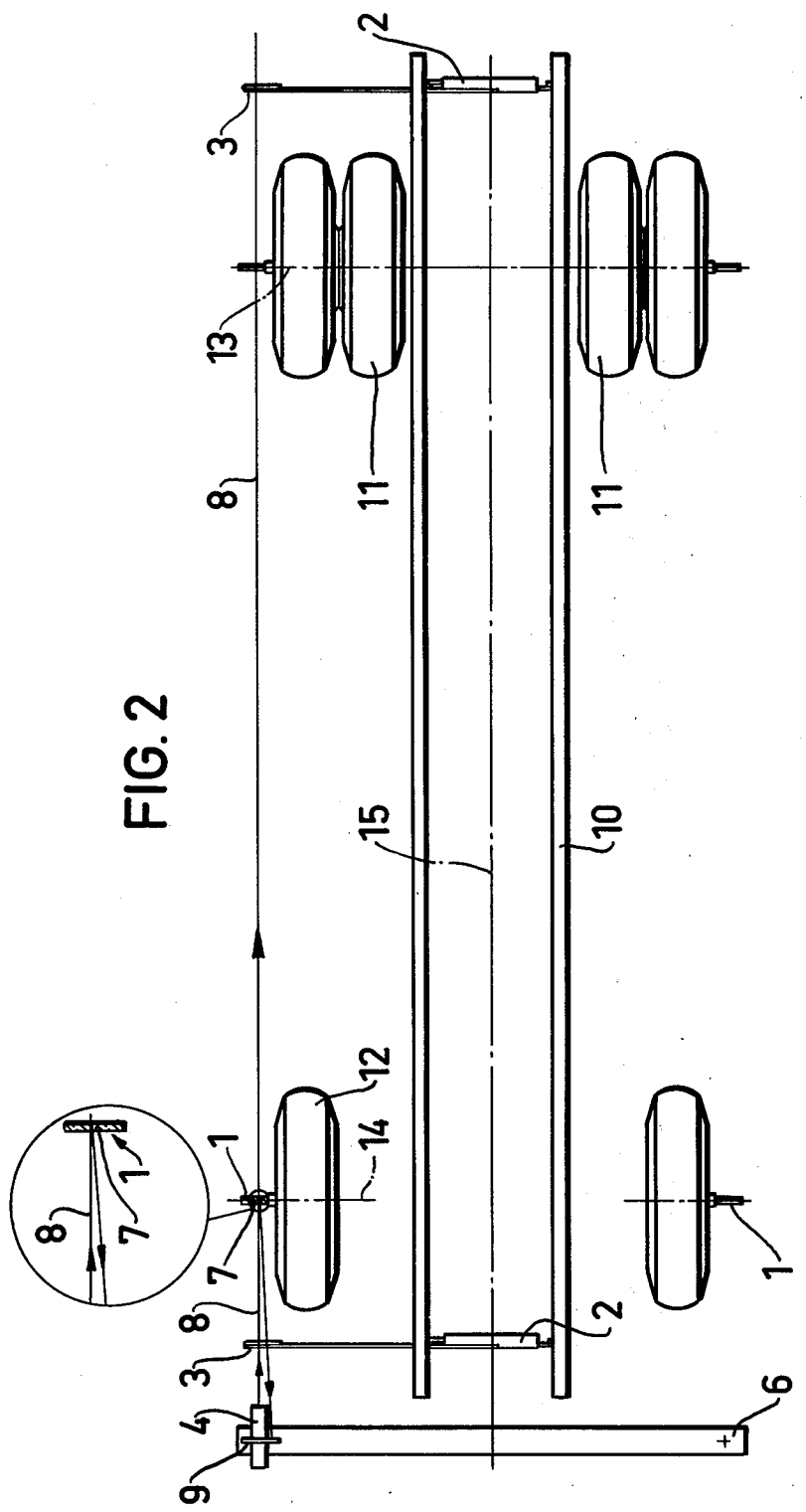
Figure 3:
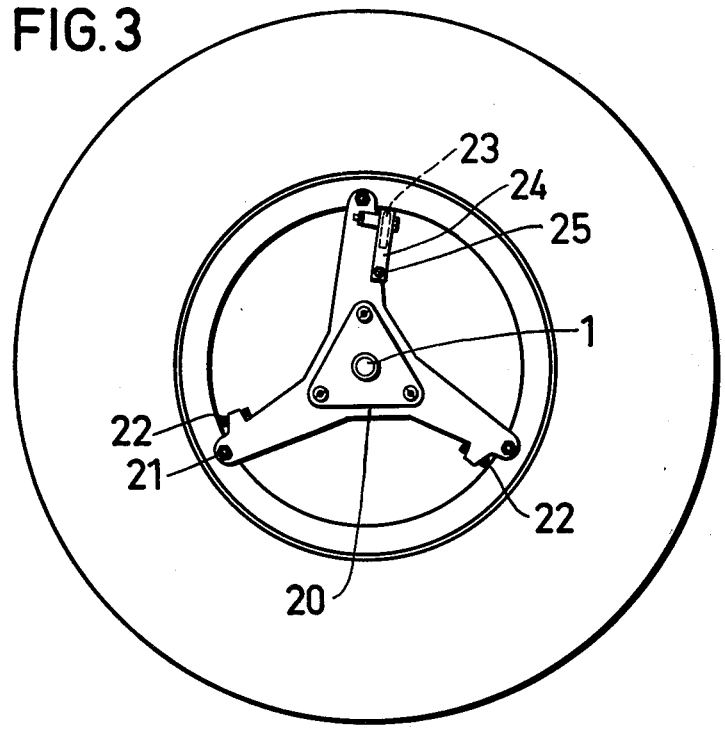
Figure 4:
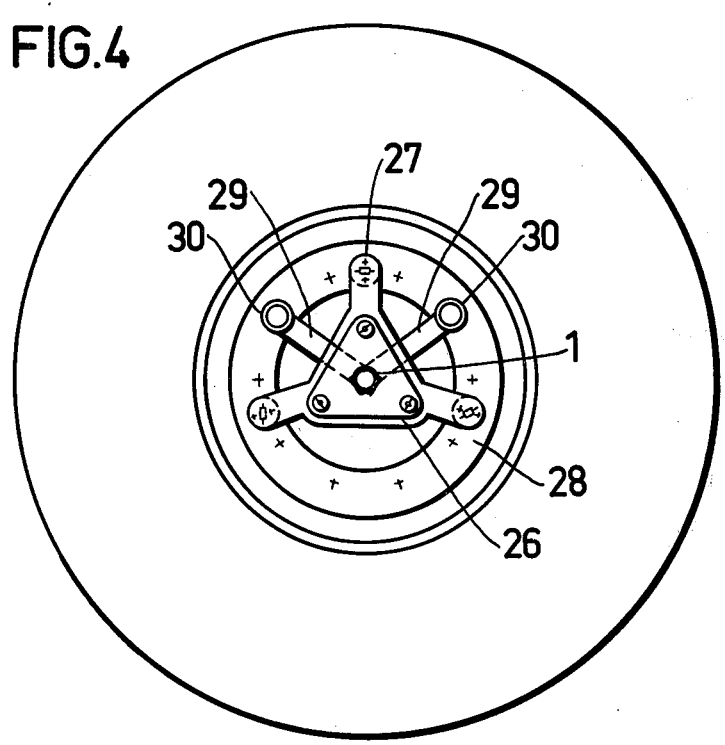

Two embodiments of the invention are described in the following, with reference to the accompanying drawings, in which FIG. 1 by a horizontal view and in a simplified manner shows a vehicle and its chassis in connection with a first embodiment of the idea of the invention, FIG. 2 shows in the same way as FIG. 1 a vehicle and its chassis, but in connection with a second embodiment of the idea of the invention, FIG. 2a shows, in enlarged scale, the mirror 7 and ray paths at the geometric axis of rotation appearing in FIG. 2;

FIG. 3 shows a device for effecting an extension of the axis of rotation of a rear wheel by means of an axle journal, FIG. 4 shows a device corresponding to that in FIG. 3, but intended for a front wheel.

In FIG. 1 a vehicle chassis 10 is shown which has left and right longitudinal frame members 40 and 42 and which is provided with two pairs of wheels. The rear wheels are designated by 11, and the front wheels by 12. The rear wheels 11 are supported on a common axle 13. The front wheels have separate axles 14. The line 15 drawn in the Figure is the chassis centre line, in relation to which the positions of the axes of rotation of the wheels must be perpendicular. The chassis centerline 15 is between and equidistant from both frame members 40 and 42.

When determining the positions of the axes of rotation, the first measure is to accomplish an extension of the axis of rotation of the respective wheel. This can be achieved in different ways. FIGS. 3 and 4 show a suitable device for rear wheels and, respectively, a suitable device for front wheels. These devices will be described in greater detail below. In principle, the devices comprise an axle journal 1 attached to the outside of the wheels. Said journal is movably adjustable and can by rotation of the wheel be caused to assume a position coinciding with the geometric axis of rotation of the wheel. It is not within the scope of the idea of this invention to produce said geometric axis, but this is carried out in known manner. It is, however, described below in conjunction with FIGS. 3 and 4.

Preferably at each end of the chassis 10 two measuring rods 2 are positioned which at their ends are provided each with a scale 3. As shown in FIG. 1, measuring rods 2 each include a central housing 44 suspended between frame members 40 and 42 by means of centering calipers 46 and 48 which operate in a known manner to center housing 44 between frame members 40 and 42. Central housing 44 supports extension arms 50 and 52 which extend from chassis 10 in a direction transverse to vehicle centerline 15 to a point slightly outside the wheels. Arms 50 are the same length so that zero-points on the front and rear scales 3 on one side of the vehicle are equally spaced from the vehicle centerline 15. Arms 52 are equal in length so that the zero points on the scales on the other side of the vehicle are also equally spaced from the vehicle centerline. The centering calipers 46 and 48 on housing 44 of rods 2 permits the front and rear scales 3 on one side of the vehicle to be positioned the same direction from vehicle centerline 15. The zero-points of the scales are equally spaced from the centre line 15 of the chassis and located slightly outside the wheels so that there is free sight from scale to scale outside the outer surfaces of the wheels. The order to determine the angular position of the axis of rotation 1 relative to the longitudinal axis of the chassis, a sight instrument 4 is provided, for example binoculars with graticule, or a diopter with two points, perpendicularly to the geometric axis of rotation 1.

The method comprises the steps of arranging a sight line across the extension of the axis of rotation of the wheel and substantially in a plane in common with the longitudinal axis, and comparing with each other the optical extensions of the sight line in both directions each in a point with respect to the positions of the points in relation to the longitudinal axis. In this case the sight instrument 4 is observed from one scale 3 to the other scale 3, and the deviations of the sight line from the zero-points of the respective scale 3 are determined. The deviation is a measure of the oblique direction of the sight line in relation to the centre line 15. The size of the angle can be determined by simple mathematical calculations.

It is also easy by means of this method to adjust the position of the axis of rotation of the wheel, in such a way, that the wheel axle is moved in one direction or the other in relation to the chassis until the sight line through the sight instrument 4 coincides with the same scale points on the scale 3 at one end of the chassis as on the scale 3 at the other end of the chassis. These common points may be the zero-points of the scales. It is to be observed that, thus, the sight line 5 by the instrument 4 has been given a direction, which is perpendicular to the geometric axis of rotation of the wheel, and the sight line thereby follows the dislocation, which may take place when the axle 13 of the wheel is being adjusted.

In FIG. 2 another embodiment of the method is shown. In this case it is applied to a front wheel, but it may be utilized on a rear wheel as well. The reference numerals used in FIG. 2 are, for corresponding details, the same as in FIG. 1. This embodiment is different from the aforedescribed one thereby, that the sight instrument 4, instead of being attached on the extension of the axis of rotation of the wheel, is arranged on a ruler 6 in such a manner, that the sight line through the sight instrument 4 extends in parallel with the centre line 15 of the vehicle. The resulting sight line through the sight instrument 4 must extend outside of the wheels. The extension 1 of the geometric axis of rotation of the wheel is accomplished in the aforementioned manner, and a mirror 7 is mounted in parallel with said geometric axis and in a plane perpendicular to the sight line 8. Said sight line 8 is reflected in the mirror 7 and re-radiated to the sight instrument 4 and caught on a scale 9, which may be located, for example, above the sight instrument 4. When the geometric axis 1 forms an angle deviating from 90° with the longitudinal axis 15, i.e. the angle is not 90° to the sight line 8, the reflected part of the sight line 8 will meet the scale 9 in a point located to the side of the centre line for the sight instrument 4. This implies, in other words, that the outgoing part of the sight line 8 and the reflected part thereof do not coincide, and the angle between the two lines represents the angle by which the geometric axis 1 deviates from the right angle to the centre line 15. The scale 9 may also be built-in in the sight instrument 4. Instead of a scale 9, a scale 3 corresponding to that at the embodiment of the invention described in FIG. 1 may be located between the sight instrument 4 and the mirror 7. In FIG. 2a the mirror 7 and the ray path thereagainst are shown enlarged.

FIG. 3 shows a device for mounting the axle journal 1, which constitutes the geometric extension of the axis of rotation of the rear wheel. The device comprises a plate 20 with three arms, in the centre of which plate the axle journal 1 is mounted in a ball joint so as to be adjustable in all imaginable angular positions outward from the plate 20. Said ball joint is not shown in detail. The plate 20 is attached to the lateral plane of the wheel rim, and three support screws 21 act against the lateral plane of the rim in such a manner, that the plate 20 is caused to lie in a plane in parallel with the lateral plane of the rim. At two of said arms of the plate, furthermore, two adjustable support screws 22 are provided which act radially against the inside of the rim. A third support screw 23 is provided on the third arm of the plate and acts also radially against the inside of the rim. This latter support screw is mounted on a lockable lever 24, which at its end facing the wheel centre is provided with a locking screw 25, which upon its tightening fixes the plate 20 in the rim of the wheel.

After the plate 20 has been fixed in the rim so that its centre coincides with the wheel centre, the axle journal 1 can be so aligned that it coincides with the axis of rotation of the wheel. This can be accomplished in a simple manner thereby that the wheel is rotated and during this rotation the axle journal 1 is centered. The axle journal can thereafter be locked in fixed position in a suitable way and is then coinciding with the axis of rotation of the wheel. This having been performed, the prerequisites for using the devices have been created which were described in conjunction with FIGS. 1 and 2 and in agreement with the idea of the invention. It is to be understood, however, that the idea of the invention is not restricted by this method of making an axis coincide with the axis of rotation of the wheel, but that other devices and methods may be of help in this conjunction.

In FIG. 4 another device is shown by which the axle journal 1 can be attached so as to coincide with the axis of rotation of the wheel. The device shown in FIG. 4 is adapted for use preferably at the front wheels of conventional vehicles. The device comprises a plate 26 having three arms like the plate mentioned above. At the end of each arm a holding magnet 27 is provided with acts on the rim plane 28. For centering the plate 26 in relation to the wheel, two arms 29 are used which are fastened with their free ends each on a wheel nut 30. The plate 26 having been so centered that its centre coincides with the centre of the wheel axle, the axle journal 1 is aligned in the same way as described above so as to coincide with the geometric extension of the wheel axle.

The idea of the invention has been described above in conjunction with certain instruments and devices, but it is to be pointed out that the idea of the invention is not restricted to the use of these means and wide variations can be imagined. The sight means, for example, have not been specified particularly nor have alternative sight means been mentioned. It is to be understood that the sight means may be radiation sources, which emit light beams or beams of other kind, and the term sight line comprises all forms of beams or sight lines which can be observed in a suitable way. Other examples are, thus, light beam and laser beam. In the attached claims, the definition sight line is used for these terms.

We claim:

1. A method for measuring the angular position of a fixed axis of rotation of a wheel of a wheeled vehicle in relation to the longitudinal axis of such vehicle, which comprises:

determining the longitudinal axis of the vehicle:

determining the true axis of rotation of the wheel;

arranging a sight line across an extension of said axis of rotation so that the sight line and the axis of rotation form a right angle between each other, said sight line being placed substantially in a plane in common with said longitudinal axis of said vehicle;

establishing a first reference scale an arbitrary distance from said axis of rotation having a zero point a predetermined distance from said longitudinal axis;

establishing a second reference scale at another distance from said axis of rotation and having a zero point at the same predetermined distance from said longitudinal axis;

determining the amount the optical extension of said sight line varies from said zero point on said first scale;

determining the amount the optical extension of said sight line varies from said zero point on said second scale; and, comparing said first scale zero-point variant to said second scale zero-point variant to determine the angular position of said fixed axis of rotation with respect to said vehicle longitudinal axis.

2. The method of claim 1 wherein said first reference scale is positioned forward of said axis of rotation and said second reference scale is positioned rearward of said axis of rotation.

3. The method of claim 1 for use with a vehicle chassis with right and left frame members disposed on opposite sides of the vehicle longitudinal axis wherein the longitudinal axis of the vehicle is determined by centering a support housing between said frame members by means of adjustable centering calipers.

4. An apparatus for measuring the angular position of a fixed axis of rotation of a wheel of a wheeled vehicle in relation to the longitudinal axis of such vehicle comprising:

first means for defining the centerpoint of said frame and adapted for attachment to the frame of said vehicle at a point spaced longitudinally from said fixed axis a first distance;

second means for defining the centerpoint of said frame and adapted for attachment to the frame of said vehicle at a point spaced longitudinally from said fixed axis a second distance;

said first and second defined centerpoints defining the vehicle longitudinal axis:

first and second scales supported by said first and second centerpoint defining means repsectively, each of said scales having zero-points positioned a predetermined transverse distance from said vehicle longitudinal axis on the same side of said vehicle; and a sight instrument affixed to said vehicle and arranged with its sight line substantially perpendicular to said fixed axis of rotation and positioned so that the extension of said sight line impinges on both of said scales whereby the difference in deviation of said sight line extension from the first and second scale zero-points provide an indication of the angular position of said fixed axis with respect to said longitudinal axis.

5. The apparatus of claim 4 wherein said first scale is forward of said fixed axis and said second scale is rearward of said fixed axis.

6. A method for measuring the angular position of a fixed axis of rotation of a wheel of a wheeled vehicle in relation to the longitudinal axis of such vehicle, which comprises:

determining the axis of rotation of the wheel;

establishing a sight line across an extension of said axis of rotation and extending in parallel with said longitudinal axis of said vehicle, said sight line being produced by an optical device arranged in front of said vehicle;

mounting a mirror parallel to said axis of rotation in a plane perpendicular to said sight line so that said sight line will be reflected;

determining the direction of said reflected sight line; and determining the difference between the incident and reflected sight line.

* * * * *